(12) United States Patent
Dubensky et al.

(10) Patent No.: US 6,417,276 B2
(45) Date of Patent: Jul. 9, 2002

(54) THERMOFORMABLE ETHYLENE/STYRENE INTERPOLYMER-BASED POLYMER BLEND FILM FOR THREE-DIMENSIONAL TRANSFER FINISH FOIL

(75) Inventors: Ellen M. Dubensky, Midland, MI (US); William R. Van Volkenburgh, Lake Jackson, TX (US); Michael D. Read; Robert L. McGee, both of Midland, MI (US); Susan E. Dollinger, Saginaw, MI (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/745,059

(22) Filed: Dec. 20, 2000

Related U.S. Application Data

(60) Provisional application No. 60/174,892, filed on Jan. 7, 2000.

(51) Int. Cl.[7] .......................... C08L 23/00; C08L 23/04; C08L 45/00; C08L 25/02
(52) U.S. Cl. ....................... 525/191; 525/216; 525/240; 525/241
(58) Field of Search ............................... 525/191, 216, 525/240, 241

(56) References Cited

U.S. PATENT DOCUMENTS

| | | | |
|---|---|---|---|
| 5,055,438 A | 10/1991 | Canich | 502/117 |
| 5,057,475 A | 10/1991 | Canich et al. | 502/104 |
| 5,064,802 A | 11/1991 | Stevens et al. | 502/155 |
| 5,096,867 A | 3/1992 | Canich | 502/103 |
| 5,132,380 A | 7/1992 | Stevens et al. | 526/126 |
| 5,189,192 A | 2/1993 | LaPointe et al. | 556/11 |
| 5,244,996 A | 9/1993 | Kawasaki et al. | 526/347 |
| 5,321,106 A | 6/1994 | LaPointe | 526/126 |
| 5,347,024 A | 9/1994 | Nickias et al. | 556/11 |
| 5,350,723 A | 9/1994 | Neithamer et al. | 502/104 |
| 5,374,696 A | 12/1994 | Rosen et al. | 526/126 |
| 5,399,635 A | 3/1995 | Neithamer et al. | 526/126 |
| 5,460,818 A | 10/1995 | Park et al. | 426/415 |
| 5,470,993 A | 11/1995 | Devore et al. | 556/11 |
| 5,652,315 A | 7/1997 | Inoue et al. | 526/153 |
| 5,703,187 A | 12/1997 | Timmers | 526/282 |
| 5,721,185 A | 2/1998 | LaPointe et al. | 502/117 |
| 5,869,591 A | 2/1999 | McKay et al. | 526/347 |
| 5,883,213 A | 3/1999 | Arai et al. | 526/347 |
| 5,911,940 A | 6/1999 | Walton et al. | 264/415 |
| 5,972,480 A | 10/1999 | Yoshikawa et al. | 428/195 |
| 5,977,271 A | 11/1999 | McKay et al. | 526/170 |
| 5,981,009 A | 11/1999 | Iacono et al. | 428/40.1 |
| 6,008,294 A | 12/1999 | Bonekamp et al. | 525/98 |
| 6,066,709 A | 5/2000 | Arai et al. | 526/347 |
| 6,118,013 A | 9/2000 | Devore | 556/11 |
| 6,156,842 A * | 12/2000 | Hoenig et al. | 525/171 |
| 6,166,145 A * | 12/2000 | Guest et al. | 525/241 |
| 6,184,294 B1 * | 2/2001 | Park et al. | 525/191 |
| 6,284,842 B1 * | 9/2001 | Ho et al. | 525/194 |

FOREIGN PATENT DOCUMENTS

| | | | |
|---|---|---|---|
| DE | 197 11 339 A1 | 3/1998 | |
| EP | 0 416 815 | 3/1991 | |
| EP | 0 514 828 | 11/1992 | |
| JP | 07/278230 | 12/1995 | |
| WO | 94/00500 | 1/1994 | |
| WO | 95/32095 | 11/1995 | |
| WO | 98/09999 | 3/1998 | |
| WO | WO 98/10014 | 3/1998 | ........... C08L/23/02 |
| WO | WO 98/10015 | 3/1998 | ........... C08L/23/02 |

OTHER PUBLICATIONS

Polymer Preprints, Am. Chem. Soc., Div. Polym. Chem., Copolymerization of Styrene and Propene with Supported Ti Catalyst Comprising Nd Compound, vol. 35, pp. 686–687, 1994.

Journal of Applied Polymer Science, Copolymerization of Ethylene and Styrene with Supported $TiCl_4/NdCl_3$ Catalyst, vol. 53, pp. 1453–1460, 1994.

Macromol Chem. Phys., Influence of Polymerization Conditions on the Copolymerization of Styrene with Ethylene Using $Me_2Si(Me_4Cp)(N-tert-butl)TiCl2$/methylaluminoxane Ziegler–Natta Catalysts, vol. 197, pp. 1071–1083, 1997.

Polymer Preprints, Novel Copolymer of Ethylene and Styrene produced by Bridged Metallocene Catalysts, Am. Chem. Soc., Div. Polym. Chem., vol. 38, pp. 349–350, 1997.

* cited by examiner

*Primary Examiner*—Nathan M. Nutter

(57) ABSTRACT

Thermoformable films that contain a blend and/or composite structure containing an ethylene/vinyl or vinylidene aromatic polymer or an alpha-olefin/vinyl or vinylidene aromatic polymer, such as an ethylene/styrene interpolymer, a vinyl or vinylidene aromatic homo- or copolymer, such as polystyrene, and, optionally, an alpha-olefin homo- or copolymer serve as effective carrier layers for heat transfer foils.

17 Claims, No Drawings

THERMOFORMABLE ETHYLENE/STYRENE INTERPOLYMER-BASED POLYMER BLEND FILM FOR THREE-DIMENSIONAL TRANSFER FINISH FOIL

This Application claims the benefit of U.S. Provisional Application Ser. No. 60/174,892, filed Jan. 7, 2000.

FIELD OF THE INVENTION

This invention generally concerns a polymer film suitable for use as a carrier layer in a thermoformable or membrane-pressable heat transfer foil. This invention particularly concerns such a film made from a blend and/or composite structure containing an ethylene/styrene interpolymer (ESI) and a polymer formed from at least one vinyl or vinylidene aromatic monomer, at least one hindered aliphatic vinyl or vinylidene monomer or both. This invention more particularly concerns such a film wherein the blend also includes a homopolymer or interpolymer of aliphatic alpha-olefins (α-olefins) having from 2 to 20 carbon atoms ($C_{2-20}$) and, optionally, a monomer containing a polar group. This invention still more particularly concerns such films, both as a monolayer and as a component of a multi-layer film structure.

BACKGROUND OF THE INVENTION

Heat transfer films or foils for thermal imprinting of a substrate typically include a carrier layer that is temporarily or removably bonded to one or more layers that are transferred to the substrate. The number of layers transferred to the substrate varies depending on chosen applications. A transfer foil often contains a carrier layer, a release or separating layer temporarily bonded to the carrier layer, one or more protective coating layers permanently bonded to a side of the release layer other than the side adjacent the carrier layer, a pigmented or dye containing layer permanently bonded to the protective layer, and an adhesive layer permanently bonded to a surface of the dye layer other than that which bonds to the protective coating layer to bond the transferred layers to the substrate. Skilled artisans recognize that the release layer may, in some applications, also function as a protective layer. Skilled artisans also recognize that "permanent", as used herein implies a much greater bonding duration than a material that readily peels away from a substrate. Nonetheless, use of scrapers or other implements may effect a mechanical destruction of one or more of the layers transferred to the substrate.

In practice, one places a heat transfer foil against a substrate, applies heat through the foil, under pressure, to transfer dye or pigment layer(s) to the substrate, and then removes the carrier layer for further handling or disposal as appropriate. When using heat transfer foils to imprint wood products, such as ready-to-assemble furniture, one often includes at least one scratch resistant coating to protect the dye or pigment layer(s). Heat transfer foils also provide a decorative pattern, such as a wood grain pattern, to other substrates such as countertops, walls, siding, automobile surfaces, wood profiles and edge banding, glass, metal or plastic substrates.

Conventional heat transfer films or foils readily transfer an image, dye or pigment onto a flat, two dimensional surface or substrate. These conventional foils may encounter difficulty when the substrate takes on a three dimensional character, as in the case of a wood panel with multiple contours, uneven surfaces or both. The difficulty may range from inadequate thermoformability as evidenced by failure to conform to all of the contours to bubbling or wrinkling of transferred layers or distortion of the transferred image, die or pigment. Heat transfer foils based upon polyvinyl chloride (PVC) or polyvinyl alcohol (PVOH) typically have satisfactory thermoformability but raise other problems or concerns. One or both of environmental concerns and migration of low molecular weight plasticizers drive(s) efforts to replace PVC films. PVC films are also limited to lower draw ratios during membrane pressing operations, which limits contour design options of a 3-dimensional panel. While PVOH films meet many performance constraints, they do so at an economically unattractive cost. In addition, PVOH films tend to be moisture sensitive or even water-soluble, at least to some degree. On a practical level, this translates to concerns about film dimensional stability and leads to use of controlled atmosphere processing in order to achieve and maintain consistent coating and printing performance. A continuing need exists for a heat transfer foil that has good thermoformability with none of the environmental concerns of PVC or cost and performance concerns of PVOH, especially for use in the furniture industry. Heat transfer foils based upon polyethylene terephthalate do not have satisfactory thermoformability and therefore tend to be limited to applications on flat two-dimensional surfaces.

A first aspect of the invention is a thermoformable polymer film, the film being used as a heat transfer foil carrier layer and comprising a blend of a first polymer that is a substantially random interpolymer comprising in polymerized form i) one or more of ethylene and an α-olefin monomer and ii) one or more vinyl or vinylidene aromatic monomers and/or one or more sterically hindered aliphatic or cycloaliphatic vinyl or vinylidene monomers, and optionally iii) other polymerizable ethylenically unsaturated monomer(s) and a second polymer comprising in polymerized form a) one or more vinyl or vinylidene aromatic monomers, or b) one or more sterically hindered aliphatic or cycloaliphatic vinyl or vinylidene monomers, or c) a combination of a) and b).

In a related aspect, the blend of the first and second polymers further comprises a third polymer. The third polymer is selected from a polypropylene homopolymer, an interpolymer of propylene and one or more of ethylene or a $C_{4-8}$ (α-olefin monomer or both, or a polymer that comprises in polymerized form x) one or more of ethylene and a $C_{3-20}$ aliphatic α-olefin or y) one or more ethylene and a $C_{3-20}$ α-olefin that contains at least one polar group. The third polymer is preferably polypropylene homopolymer or a propylene interpolymer.

A second aspect of the invention is a thermoformable film-forming polymer blend composition comprising a blend of a first polymer that is a substantially random interpolymer comprising in polymerized form, i) one or more of ethylene and an α-olefin monomer and ii) one or more vinyl or vinylidene aromatic monomers and/or one or more sterically hindered aliphatic or cycloaliphatic vinyl or vinylidene monomers, and optionally iii) other polymerizable ethylenically unsaturated monomer(s), a second polymer comprising in polymerized form a) one or more vinyl or vinylidene aromatic monomers, or b) one or more sterically hindered, aliphatic or cycloaliphatic vinyl or vinylidene monomers, or c) a combination of a) and b), and a third polymer. The third polymer is selected from a polypropylene homopolymer, an interpolymer of propylene and one or more of ethylene or a $C_{4-8}$ α-olefin monomer or both, or a polymer that comprises in polymerized form, x) one or more of ethylene and a $C_{3-20}$ aliphatic α-olefin or y) one or more of ethylene and a $C_{3-20}$ α-olefin that contains at least one polar group. The third polymer is preferably polypropylene homopolymer or a propylene interpolymer.

DESCRIPTION OF PREFERRED EMBODIMENTS

A blend of at least one first polymer or interpolymer and at least one second polymer or interpolymer forms a thermoformable film suitable for use as a carrier layer for heat transfer foil. The blend desirably includes at least one third polymer or interpolymer.

The first polymer is a substantially random interpolymer comprising in polymerized form, i) one or more of ethylene and an α-olefin monomer and ii) one or more vinyl or vinylidene aromatic monomers and/or one or more sterically hindered aliphatic or cycloaliphatic vinyl or vinylidene monomers, and optionally iii) other polymerizable ethylenically unsaturated monomer(s).

The second polymer comprises in polymerized form a) one or more vinyl or vinylidene aromatic monomers, or b) one or more sterically hindered aliphatic or cycloaliphatic vinyl or vinylidene monomers, or c) a combination of a) and b).

The third polymer is selected from a polypropylene homopolymer, an interpolymer of propylene and one or more of ethylene or a $C_{4-8}$ α-olefin monomer or both, or a polymer that comprises in polymerized form, x) one or more of ethylene and a $C_{3-20}$ aliphatic α-olefin or y) one or more of ethylene and a $C_{3-20}$ α-olefin that contains at least one polar group. The third polymer is preferably polypropylene homopolymer or a propylene interpolymer, especially when preparing monolayer film structures.

Unless stated otherwise, as in the case of "less than (<) 50 weight percent (wt %)", all ranges stated herein include both range endpoints.

The term "interpolymer", as used herein, refers to a polymer having polymerized therein at least two different monomers.

The term "substantially random", as used herein with respect to the first polymer, generally means that monomer distribution within said interpolymer can be described by the Bernoulli statistical model or by a first or second order Markovian statistical model, as described by J. C. Randall in *POLYMER SEQUENCE DETERMINATION, Carbon-13 NMR Method*, Academic Press New York, 1977, pp. 71–78. The first polymer preferably contains no more than 15 percent (%) of the total amount of vinyl or vinylidene aromatic monomer as blocks of vinyl or vinylidene aromatic monomer that contain more than 3 units. The first polymer more preferably lacks a high degree of either isotacticity or syndiotacticity. This means that, in the carbon$^{-13}$ NMR spectrum of the first polymer (also referred to as a "substantially random interpolymer"), peak areas corresponding to main chain methylene and methine carbons representing either meso diad sequences or racemic diad sequences should not exceed 75% of the total peak area of the main chain methylene and methine carbons. As subsequently used herein, "substantially random interpolymer" refers to a substantially random interpolymer produced from the above-mentioned monomers.

In addition to ethylene, α-olefin monomers suitable for use in preparing the first polymer include, for example, α-olefin monomers containing from 3 to 20 ($C_{3-20}$), preferably from 3 to 12 ($C_{3-12}$), more preferably from 3 to 8 ($C_{3-8}$) carbon atoms. In addition to ethylene, particularly suitable α-olefins or α-olefin monomers include propylene, butene-1, 4-methyl-1-pentene, hexene-1 or octene-1. Combinations of ethylene with one or more of propylene, butene-1, 4-methyl-1-pentene, hexene-1 or octene-1 are also quite suitable. The monomer is preferably ethylene or a combination of ethylene and at least one $C_{3-8}$ α-olefin. These monomers do not contain an aromatic moiety.

Other optional polymerizable ethylenically unsaturated monomer(s) suitable for inclusion in the first polymer include strained ring olefins such as norbornene and $C_{1-10}$ alkyl or $C_{6-10}$ aryl substituted norbornenes. One such interpolymer is an ethylene/styrene/norbornene interpolymer.

Vinyl or vinylidene aromatic monomers suitable for use in preparing the first polymer include, for example, those represented by the following Formula I

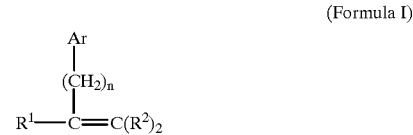

(Formula I)

wherein $R^1$ is selected from the group of radicals consisting of hydrogen and $C_{1-4}$ alkyl radicals, preferably hydrogen or methyl; each $R^2$ is independently selected from the group of radicals consisting of hydrogen and $C_{1-4}$ alkyl radicals, preferably hydrogen or methyl; Ar is a phenyl group or a phenyl group substituted with from 1 to 5 substituents selected from the group consisting of halo, $C_{1-4}$-alkyl, and $C_{1-4}$-haloalkyl; and n has a value from zero to 4, preferably from zero to 2, most preferably zero. Particularly suitable monomers represented by Formula I include styrene and lower alkyl- or halogen-substituted derivatives thereof. Preferred monomers include styrene, α-methyl styrene, the lower alkyl-($C_1$–$C_4$) or phenyl-ring substituted derivatives of styrene, such as for example, ortho-, meta-, and para-methylstyrene, t-butyl styrene, the ring halogenated styrenes, such as chlorostyrene, para-vinyl toluene or mixtures thereof. A more preferred aromatic monovinyl monomer is styrene.

The term "sterically hindered aliphatic or cycloaliphatic vinyl or vinylidene monomer" means an addition polymerizable vinyl or vinylidene monomer corresponding to the formula:

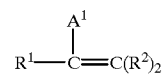

wherein $A^1$ is a sterically bulky, aliphatic or cycloaliphatic substituent of up to 20 carbons, $R^1$ is selected from the group of radicals consisting of hydrogen and $C_{1-4}$ alkyl radicals, preferably hydrogen or methyl; each $R^2$ is independently selected from the group of radicals consisting of hydrogen and $C_{1-4}$ alkyl radicals, preferably hydrogen or methyl; or alternatively $R^1$ and $A^1$ together form a ring system. The term "sterically bulky" means that the monomer bearing this substituent is normally incapable of addition polymerization by standard Ziegler-Natta polymerization catalysts at a rate comparable with ethylene polymerization. Ethylene and $C_{3-20}$ α-olefin monomers that have a linear aliphatic structure, such as propylene, butene-1, hexene-1 and octene-1, do not qualify as sterically hindered aliphatic monomers. Preferred sterically hindered aliphatic or cycloaliphatic vinyl or vinylidene compounds are monomers in which one of the carbon atoms bearing ethylenic unsaturation is tertiary or quaternary substituted. Examples of such substituents include cyclic aliphatic groups such as cyclohexyl, cyclohexenyl, cyclooctenyl, or ring alkyl or aryl-substituted derivatives thereof, tert-butyl or norbornyl. More preferred sterically hindered aliphatic or cycloaliphatic vinyl or vinylidene compounds include the various isomeric vinyl-ring substituted derivatives of cyclohexene and substituted cyclohexenes, and 5-ethylidene-2-norbornene. Especially suitable are 1-, 3-, and 4-vinylcyclohexene.

The most preferred substantially random interpolymers are interpolymers of ethylene and styrene and interpolymers of ethylene, styrene and at least one $C_{3-8}$ α-olefin (referred to herein as "ethylene/styrene interpolymers" or "ESIs"). Preferred substantially random interpolymers with two or more of ethylene and an α-olefin monomer, and a vinyl aromatic monomer include interpolymers of ethylene, propylene, and styrene.

The substantially random interpolymers usually comprise in polymerized form, i) from 0.5 to 65, preferably from 5 to 55, more preferably from 20 to 50, most preferably from 30 to 45 mole percent of at least one vinyl or vinylidene aromatic monomer and/or sterically hindered aliphatic or cycloaliphatic vinyl or vinylidene monomer and ii) from 35 to 99.5, preferably from 45 to 95, more preferably from 50 to 80, most preferably from 55 to 70 mole percent of at least one of ethylene and/or a $C_{3-20}$ aliphatic α-olefin. All percentages are based on the interpolymer and total 100 mole percent.

The first polymer desirably has a melt index or $I_2$ (according to ASTM D 1238 Procedure A, condition E) of from 0.01 to 50 grams per 10 minutes (g/10 min), preferably from 0.0 to 10 g/10 min, more preferably from 0.1 to 5 g/10 min, and most preferably from 0.1 to 3 g/10 min. The first polymer has a glass transition temperature (Tg) that is preferably from −40° centigrade (°C.) to +35° C., more preferably from 0° C. to +30° C., most preferably from +15° C. to +30° C., measured according to differential mechanical scanning (DMS). The polymer blend may contain two or more first polymers with different Tg's.

The first polymer has a density that is desirably at least 0.930 grams per cubic centimeter (g/cm$^3$), preferably from 0.930 to 1.045 g/cm$^3$, more preferably from 0.930 to 1.040 g/cm$^3$, most preferably from 0.930 to 1.030 g/cm$^3$. The first polymer has a molecular weight distribution (MWD or ratio of weight average molecular weight ($M_w$) to number average molecular weight ($M_n$) ($M_w/M_n$)) of from 1.5 to 20, preferably from 1.8 to 10, more preferably from 2 to 5.

While preparing the first polymer, an amount of a tactic vinyl or vinylidene aromatic homopolymer may be formed due to homopolymerization of the vinyl or vinylidene aromatic monomer at elevated temperatures. The presence of vinyl or vinylidene aromatic homopolymer is in general not detrimental for the purposes of the present invention and can be tolerated. The vinyl or vinylidene aromatic homopolymer may be separated from the substantially random interpolymer, if desired, by extraction techniques such as selective precipitation from solution with a nonsolvent for either the substantially random interpolymer or the vinyl or vinylidene aromatic homopolymer. The first polymer preferably contains no more than 30 weight percent (wt %), preferably less than 20 wt %, based on the total first polymer weight, of a tactic vinyl or vinylidene aromatic homopolymer.

The first polymer, when part of a formulation that includes first, second and third polymers, is desirably present in an amount that varies depending upon selection of the third polymer. If the third polymer is one that comprises, in polymerized form, x) one or more of ethylene and an aliphatic α-olefin having from 3 to 20 carbon atoms or y) one or more of ethylene and an α-olefin having from 3 to 20 carbon atoms and containing polar groups, the amount of first polymer is within a range of from 20 to 40 wt % of total formulation or thermoformable polymer film weight. The range is preferably from 30 to 40 wt %. If the third polymer is polypropylene homopolymer or a propylene interpolymer, the range of first polymer is from 20 to 45 wt %, preferably from 30 to 40 wt %. The amounts of second and third polymers in such a formulation also vary depending upon the polymer selected for the third polymer. If the third polymer is polypropylene homopolymer or a propylene interpolymer, the amount of second polymer is within a range of from 25 to 45 wt %, preferably from 30 to 40 wt %, and the amount of third polymer is within a range of from 20 to 55 wt %, preferably from 25 to 35 wt %. For certain applications, a high propylene polymer content produces satisfactory results. In such applications, the amounts of first, second and third polymers are, respectively, from 20 to 40 wt %, preferably from 20 to 30 wt %, from 20 to 40 wt %, preferably from 20 to 35 wt %, and from 30 to 60 wt %, preferably from 30 to 55 wt %. If the third polymer is a polar group-containing polymer, the amounts of second and third polymers fall within ranges that are, respectively, from 30 to 75 weight percent, and from 5 to 30 weight percent. All percentages based on combined weight of first, second and third polymers and totaling 100 percent.

If the formulation contains only first and second polymers, the range for the first polymer is from 20 to 50 wt %, preferably from 30 to 40 wt %.

The substantially random interpolymers may be modified by typical grafting, hydrogenation, functionalizing, or other reactions well known to those skilled in the art. The polymers may be readily sulfonated or chlorinated to provide functionalized derivatives according to established techniques. The substantially random interpolymers may also be modified by various chain-extending or cross-linking processes including, but not limited to peroxide-, silane-, sulfur-, radiation-, or azide-based cure systems. A full description of the various cross-linking technologies is described in copending U.S. Pat. Nos. (U.S. Patents) 5,869,591 and 5,977,271, the entire contents of both of which are herein incorporated by reference. Dual cure systems, which use a combination of heat, moisture cure, and radiation steps, may be effectively employed. Dual cure systems are disclosed and claimed in U.S. Pat. No. 5,911,940, the relevant teachings concerning non-foam materials being incorporated herein by reference. For instance, it may be desirable to employ peroxide crosslinking agents in conjunction with silane crosslinking agents, peroxide crosslinking agents in conjunction with radiation, sulfur-containing crosslinking agents in conjunction with silane crosslinking agents, etc. The substantially random interpolymers may also be modified by various crosslinking processes including, but not limited to the incorporation of a diene component as a termonomer in its preparation and subsequent crosslinking by the aforementioned methods and further methods including vulcanization via the vinyl group using sulfur for example as the crosslinking agent.

The first, second and, where present, third polymers desirably have a thermoplastic character. In other words, each of the polymers is thermoformable in that it may be molded or otherwise shaped and reprocessed at temperatures above its melting or softening point.

The substantially random interpolymers include the so called pseudo random interpolymers described in European Patent Application (EP-A) 0,416,815 by James C. Stevens et al., and U.S. Pat. No. 5,703,187 by Francis J. Timmers, both of which are incorporated herein by reference in their entirety to the extent allowed by law. The substantially random interpolymers can be prepared by subjecting a mixture of polymerizable monomers to conditions sufficient to effect polymerization thereof in the presence of one or more metallocene or constrained geometry catalysts in combination with various cocatalysts. Such conditions include pressures of from atmospheric up to 3000 atmospheres and temperatures from −30° C. to 200° C. Polymerization and unreacted monomer removal at temperatures above the autopolymerization temperature of the respective monomers may result in the formation of some amounts of homopolymer polymerization products resulting from free radical polymerization.

Examples of suitable catalysts and methods for preparing the substantially random interpolymers are disclosed in U.S. Pat. No. 6,118,013 (and its European equivalent, EP-A-514, 828); and U.S. Pat. Nos. 5,055,438; 5,057,475; 5,096,867; 5,064,802; 5,132,380; 5,189,192; 5,321,106; 5,347,024; 5,350,723; 5,374,696; 5,399,635; 5,470,993; 5,703,187; and 5,721,185 all of the U.S. Pat. Nos. being incorporated herein by reference.

The first polymer can also be prepared by the methods described in JP 07/278230 employing compounds shown by the general formula

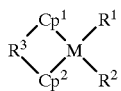

wherein $Cp^1$ and $Cp^2$ are cyclopentadienyl groups, indenyl groups, fluorenyl groups, or substituents of these, independently of each other; $R^1$ and $R^2$ are hydrogen atoms, halogen atoms, $C_{1-12}$ hydrocarbon groups, alkoxyl groups, or aryloxyl groups, independently of each other; M is a group IV metal, preferably zirconium (Zr) or hafnium (Hf), most preferably Zr; and $R^3$ is an alkylene group or silanediyl group used to cross-link $Cp^1$ and $Cp^2$).

The first polymer can also be prepared by the methods described by John G. Bradfute et al., (W. R. Grace & Co.) in WO 95/32095; by R. B. Pannell (Exxon Chemical Patents, Inc.) in WO 94/00500; and in Plastics Technology, page 25 (September 1992).

Also suitable are the substantially random interpolymers which comprise at least one α-olefin/vinyl aromatic/vinyl aromatic/α-olefin tetrad disclosed in WO-98/09999-A by Francis J. Timmers et al. These interpolymers can be prepared by conducting the polymerization at temperatures of from −30° C. to 250° C. in the presence of a catalyst as those described in WO-98/09999-A. Particularly preferred catalysts include, for example, racemic-(dimethylsilanediyl)-bis-(2-methyl-4-phenylindenyl)zirconium dichloride, racemic-(dimethyl-silanediyl)-bis-(2-methyl-4-phenylindenyl)zirconium 1,4-diphenyl-1,3 -butadiene, racemic-(dimethylsilanediyl)-bis-(2-methyl-4-phenylindenyl)zirconium di-$C_{1-4}$-alkyl, racemic-(dimethylsilanediyl)-bis-(2-methyl-4-phenylindenyl)-zirconium di-$C_{1-4}$-alkoxide, or any combination thereof.

Further preparative methods for the substantially random interpolymers used in the present invention have been described in the literature. Longo and Grassi (Makromol. Chem., volume 191, pages 2387 to 2396 [1990]) and D'Anniello et al. (Journal of Applied Polymer Science, volume 58, pages 1701 to 1706 [1995]) report the use of a catalytic system based on methylalumoxane (MAO) and cyclopentadienyltitanium trichloride ($CpTiCl_3$) to prepare an ethylene-styrene copolymer. Xu and Lin (Polymer Preprints, Am. Chem. Soc., Div. Polym. Chem., volume 35, pages 686, 687 [1994]) report copolymerization using a $MgCl_2/TiCl_4/NdCl_3/Al(iBu)_3$ catalyst to give random copolymers of styrene and propylene. Lu et al. (Journal of Applied Polymer Science, volume 53, pages 1453 to 1460 [1994]) have described the copolymerization of ethylene and styrene using a $TiCl_4NdCl_3/MgCl_2/Al(Et)_3$ catalyst. Semetz and Mulhaupt, (Macromol. Chem. Phys., volume 197, pages 1071 to 1083 [1997]) have described the influence of polymerization conditions on the copolymerization of styrene with ethylene using $Me_2Si(Me_4Cp)(N\text{-tert-butyl})TiCl_2/$ methylaluminoxane Ziegler-Natta catalysts. Copolymers of ethylene and styrene produced by bridged metallocene catalysts have been described by Arai, Toshiaki and Suzuki (Polymer Preprints, Am. Chem. Soc., Div. Polym. Chem. volume 38, pages 349, 350 [1997]) and in U.S. Pat. No. 5,652,315, issued to. The manufacture of α-olefin/vinyl aromatic monomer interpolymers such as propylene/styrene and butene/styrene are described in U.S. Pat. No. 5,244,996 or U.S. Pat. No. 5,652,315 or as disclosed in DE 197 11 339 A1. All the above methods disclosed for preparing the first polymer are incorporated herein by reference.

Polymers suitable for use as the second polymer include homopolymers of a single vinyl or vinylidene aromatic monomer and interpolymers prepared from one or more vinyl or vinylidene aromatic monomers. The vinyl and vinylidene aromatic monomers listed herein for use in preparing the first polymer function equally well in preparing the second polymer. The second polymer may also include one or more interpolymerizable comonomers other than a vinyl or vinylidene aromatic monomer. Such comonomers include $C_{4-6}$ conjugated dienes, especially butadiene or isoprene, N-phenyl maleimide, acrylamide, ethylenically unsaturated nitrile monomers such as acrylonitrile and methacrylonitrile, ethylenically unsaturated mono- and difunctional carboxylic acids and derivatives thereof such as esters and, in the case of difunctional acids, anhydrides, such as acrylic acid, $C_{1-4}$ alkyl acrylates or methacrylates such as n-butyl acrylate, methyl methacrylate and maleic anhydride. In some cases, it may also be desirable to copolymerize a cross-linking monomer such as a divinyl benzene into the second polymer.

The second polymer desirably has polymerized therein at least 50 weight percent (wt %), preferably at least 90 wt %, of one or more vinyl or vinylidene aromatic monomers. The wt % is based on second polymer weight.

The second polymer, when part of a formulation that includes first, second and third polymers, is desirably present in an amount within a range of from 40 to 80 wt % of total formulation or thermoformable polymer film weight. The range is preferably from 45 to 55 wt %. If the formulation contains only first and second polymers, the range is from 50 to 80 wt %, preferably from 60 to 70 wt %, based on combined weight of first and second polymers.

The second polymer may, if desired, be a rubber-modified polymer wherein the modifier is, for example, butadiene or isoprene. Skilled artisans readily understand availability, preparation and use of rubber-modified vinyl or vinylidene aromatic polymers and copolymers.

The third polymer, when present, is desirably a propylene homopolymer or interpolymer of propylene, ethylene and/or an aliphatic $C_{4-20}$ α-olefin, preferably a propylene/ethylene copolymer.

An alternate desired third polymer is a homopolymer or interpolymer of ethylene and/or a $C_{3-18}$ α-olefin, more preferably ethylene or a $C_{3-12}$ α-olefin, or an interpolymer of ethylene and/or an aliphatic $C_{3-20}$ α-olefin, preferably ethylene or a $C_{3-18}$ α-olefin, more preferably ethylene or a $C_{3-12}$ α-olefin that contains a polar group. Suitable aliphatic α-olefin monomers that introduce polar groups into the third polymer include, for example, ethylenically unsaturated nitriles such as acrylonitrile, methacrylonitrile, or ethacrylonitrile; ethylenically unsaturated anhydrides such as maleic anhydride; ethylenically unsaturated amides such as acrylamide or methacrylamide; ethylenically unsaturated carboxylic acids (both mono- and difunctional) such as acrylic acid and methacrylic acid; esters (especially lower, e.g., $C_1$–$C_6$, alkyl esters) of ethylenically unsaturated carboxylic acids such as methyl methacrylate, ethyl acrylate, hydroxyethylacrylate, n-butyl acrylate or methacrylate, or 2-ethyl-hexylacrylate; ethylenically unsaturated dicarboxylic acid imides such as N-alkyl or N-aryl maleimides such as N-phenyl maleimide. Preferred polar group containing monomers include acrylic acid, vinyl acetate, maleic anhydride and acrylonitrile. Halogen groups, which can be included in the polymers from ethylene and/or an aliphatic α-olefin monomer, include fluorine, chlorine and bromine; preferably such polymers are chlorinated polyethylenes (CPEs) or polyvinyl chloride.

The third polymer is preferably a propylene homopolymer or an interpolymer of propylene and one or more of ethylene or a $C_{4-8}$ α-olefin monomer or both. The third polymer is more preferably a propylene/ethylene interpolymer, especially what may be commonly referred to as an "impact grade" propylene/ethylene interpolymer. As used herein, "interpolymer" refers to polymers having polymerized therein two or more different monomers and includes what some refer to conventionally as copolymers (two monomers), terpolymers (three monomers) and tetrapolymers (four monomers). The propylene polymer has a melt flow rate or MFR (ASTM-1238, condition L, 230° C., 2.16 kilograms) in a range of from 0.01 to 100, and preferably from 0.1 to 50 g/10 min. Other preferred third polymers include linear high density polyethylene polymers (HDPE) made using Ziegler polymerization processes (for example, U.S. Pat. No. 4,076,698 (Anderson et al.), sometimes called heterogeneous polymers. HDPE consists mainly of long linear polyethylene chains. The HDPE usually has a density of at least 0.94 g/cm³ (American Society for Testing and Materials (ASTM) Test Method D 1505) and an $I_2$ (ASTM-1238, condition I) in a range of from 0.01 to 100, and preferably from 0.1 to 50 g/10 min. Still other preferred polymers include linear low density polyethylenes (LLDPE), a series of linear copolymers of ethylene and an α-olefin such as octene-1 prepared via Ziegler polymerization processes. The LLDPEs desirably have a melt index ($I_2$ 190° C., 2.16 kilogram) within the same range as the HDPEs, but a density within a range of 0.88 to 0.94 g/cm³. Suitable commercially available LLDPE resins include DOWLEX* resins (The Dow Chemical Company).
*DOWLEX is a Trademark of The Dow Chemical Company.

The third polymer, when present, desirably constitutes from 5 to 30 wt %, based upon film forming blend or thermoformable polymer film weight. The third polymer preferably constitutes from 10 to 25 wt % of total blend or film weight. When skin layers are applied to a core layer formed from such a polymer blend, these wt % ranges apply only to the core layer.

The polymer blends used to prepare thermoformable polymer films may contain one or more additives. Such additives include, for example flame retardants, such as decabromo diphenyl oxide; antioxidants, such as hindered phenols or phosphites; light stabilizers, such as hindered amines; plasticizers, such as dioctylphthalate or epoxidized soybean oil; waxes, such as polyethylene waxes; processing aids, such as stearic acid or a metal salt thereof; slip additives, such as erucamide or stearamide; antiblock additives, such as silica dioxide; lubricants; or crosslinking agents, such as peroxides or silanes. If the blends contain such additives, the additives are employed in functionally equivalent amounts known to those skilled in the art, generally in amounts of up to 30, preferably from 0.01 to 5, more preferably from 0.02 to 1 wt %, based upon blend weight.

The thermoformable polymer films preferably have a thickness of from 0.01 millimeter (mm) to 2 mm, more preferably from 0.01 mm to 1 mm, most preferably from to 0.02 mm to 0.2 mm.

The polymers used in preparing the thermoformable polymer films or film-forming blends can be combined with optional additives and processed to form a film by any suitable means known in the art such as, but not limited to, Banbury mixing, extrusion compounding, roll milling, calendering, compression molding, injection molding and/or sheet extrusion. In addition, application of other layers, such as skin layers and intermediate layers (including glue or tie layers), suitably uses known methods such as coextrusion, extrusion coating and lamination. Useful temperatures for processing polymers that constitute the polymer blends in combination with optional additives to form a polymer film generally fall within a range of from 100° centigrade (°C.) to 300° C., preferably from 120° C. to 250° C., more preferably from 160° C. to 230° C.

The thermoformable films of the present invention provide very satisfactory results when used as a monolayer film. With a propylene polymer present as a third polymer at a level in excess of about 25 weight percent, based on total film weight, the monolayer films have satisfactory solvent resistance and printability.

The thermoformable films of the present invention may, if desired, serve as part of a multilayer film structure, especially as a core layer of a multilayer film structure. Preparation of such multilayer film structures preferably employs coextrusion apparatus and processing techniques. Use of a skin layer, such as a polyolefin, preferably a polyethylene-based, film, yields discernible benefits when solvent-based printing inks are applied to thermoformable films. For example, a polyethylene-based skin layer provides solvent resistance to the film structure, protecting styrenic (vinyl or vinylidene aromatic) polymers from attack by solvents contained in certain printing inks. In addition, such a skin layer also serves as a very acceptable print layer. Conventional treatments, such as corona discharge treatment, may enhance any one or more of print acceptance, surface characteristics and adhesion characteristics. As skilled artisans readily recognize, polyolefin films such as polyethylene films do not adhere directly to vinyl or vinylidene aromatic polymer films. As such, skilled artisans place a glue, tie or adhesive layer formed from a polymer such as an ethylene/vinyl acetate (EVA) copolymer between the polyolefin film layer and the vinyl or vinylidene aromatic polymer film layer, preferably by coextrusion, to form a functionally and structurally sound multilayer film construction.

The thermoformable polymer films suitably function as a carrier layer in a heat transfer foil. In that application, the films temporarily or releasably bond to a release layer. "Temporary", as used herein, means that the carrier film can be pulled away from the release layer after completion of membrane pressing, lamination, or other heat transfer process. Separation of the thermoformable polymer film from the release layer preferably results in complete removal of the thermoformable polymer film carrier layer without tearing or creating surface defects in the release layer.

U.S. Pat. No. 5,972,480 discloses a number of resins that are suitable for use in fabricating a release layer at column 6, lines 34–54. The resins include, for example, polyvinyl butyral resin, cellulosic resins, chlorinated polypropylene resin, acrylic resin, vinyl chloride/vinyl acetate copolymer, polyamide resin, and urethane resin. U.S. Pat. No. 5,972,480 suggests, at column 6, lines 60–63, that release layer thickness may range from 0.5 to 30 micrometers ($\mu$m), usually from 2 to 10 $\mu$m.

U.S. Pat. No. 5,981,009 teaches use of a heat-activatable adhesive layer in heat transfer foils. As noted at column 4, lines 9–15, preferred adhesive layers include a thermoplastic polymer such as a polyamide copolymer, a polyester, an ethylene/vinyl acetate copolymer, a polycaprolactone, a copolymer of ethylene/vinyl acetate and polycaprolactone, and other similar polymers and polymer blends.

The following examples illustrate, but do not limit, the present invention. Unless specifically indicated otherwise, all parts and percentages are based on weight. Arabic numerals or combinations of Arabic numerals and letters of the alphabet denote examples (Ex) of the present invention. Letters of the alphabet standing alone represent comparative examples (Comp Ex).

EX 1

Coextrude a 91 $\mu$m film using a conventional three-extruder cast film line equipped with a feedblock device that arranges layers in a desired spatial arrangement (top, middle and bottom layers) and a 71.1 centimeter (cm) wide coat hanger style die and operating at a set temperature of 440° F. (227° C.) onto a temperature controlled casting roll (65° C.) and thereafter recover the film in roll form. The relative thickness of the three layers is 75% top, 10% middle and 15% bottom, all percentages based on total film thickness.

The top layer results from a blend of 49 wt % high impact polystyrene with butadiene rubber (STYRON* 404, 2.3 grams per 10 minute (g/10 min) (MFR) (ASTM D-1238, Condition G), The Dow Chemical Company), 30 wt % ESI (DS 201.01 developmental interpolymer, 1 g/10 min MFR (ASTM D-1238, Condition E), 69 wt % styrene/31 wt % ethylene (37.5 mol % styrene/62.5 mol % ethylene), The Dow Chemical Company), 20 wt % heterophasic polypropylene copolymer (INSPIRE* C105-02, 2 g/10 min MFR (ASTM D-1238, Condition L) copolymer, The Dow Chemical Company), and 1 wt % fluoroelastomer processing aid (Ampacet® 10562, 3 wt % Viton® A fluoropolymer in polyethylene from Ampacet Corporation). Viton is a trademark of DuPont Dow Elastomers L.L.C. The middle or tie layer is an ethylene/vinyl acetate copolymer (Elvax® 3190 LG, 2 g/10 min MFR (ASTM D-1238, Condition E), 25 wt % vinyl-acetate copolymer, E. I. du Pont de Nemours and Company. *INSPIRE and STYRON are trademarks of The Dow Chemical Company. The bottom or barrier layer is 95 wt % low density polyethylene (LDPE 501I, 1.90 g/10 min MFR (ASTM D-1238, Condition E), 0.922 g/cm$^3$ density, The Dow Chemical Company) and 5 wt % antiblock concentrate (CN-744, (20% SiO$_2$ in LDPE), Southwest Chemical). The weight percentages shown for components of each layer represent a fraction of total layer weight.

Use an Enercon Industries Corporation model SS2552 with a power setting of 0.6 kilowatts to corona treat the bottom layer of the film to a surface energy of 52 dynes/cm$^2$. Corona treatment increases film surface energy.

Membrane press each film onto a contoured medium density fiberboard (MDF) panel using a membrane temperature of 155° C., a pressure of 4 bar (400 kilopascals (kPa), a glue line temperature of 95° C. and a press time of 40 seconds. After pressing, evaluate thermoformability (ability to follow the contour pattern) and ease of removal of the films. All films show excellent thermoformability and can be readily removed with little or no tearing.

EX 2

Duplicate Ex 1, but increase film thickness to 96.5 $\mu$m while maintaining relative layer thickness ratios and change the top layer composition to 70 wt % polystyrene and 30 wt % ESI, both polymers being the same as in Ex 1. These films also have excellent thermoformability and ease of removal.

A comparison of tensile properties (ASTM D882) of the films of Ex 1 and Ex 2 shows that those of Ex 1 have higher elongation at break and toughness than those of Ex 2. The films of both examples provide acceptable performance in thermoforming applications.

EX 3

Duplicate Ex 2, but change the bottom layer composition and prepare a 75 $\mu$m film rather than a 96.5 $\mu$m film. The bottom layer includes 90 wt % linear low density polyethylene (LLDPE), (DOWLEX* 2047A, 2.3 g/10 min MFR (ASTM D-1238, Condition E), 0.917 g/cm$^3$ density, The Dow Chemical Company) and 10 wt % of the same antiblock concentrate as in Ex 1. *DOWLEX is a trademark of The Dow Chemical Company. These films also have excellent thermoformability and ease of removal.

EX 4

Duplicate Ex 3, but change the ESI, alter the component ratio in the top layer to 60 wt % polystyrene and 40 wt % ESI and change the composition of the bottom layer. The ESI is DS 101.01 developmental interpolymer (1 g/10 min MFR (ASTM D-1238, Condition E), 75 wt % styrene/25 wt % ethylene (44.7 mol % styrene/55.3 mol % ethylene), The Dow Chemical Company). The bottom layer composition is 95 wt % of the same LLDPE as in Ex 3 and 5 wt % of a dispersion of inorganic mica filler in high density polyethylene (Micafil® 40, DuPont Canada). These films also have excellent thermoformability and ease of removal.

EX 5

Prepare an 84.7 $\mu$m monolayer film using one of the three extruders of the apparatus described in Ex 1 and a different ratio of the same polystyrene and ESI as in Ex 4. The film composition is 65 wt % polystyrene and 35 wt % ESI. This film also has excellent thermoformability and ease of removal.

EX 6

Replicate Ex 5 to prepare a 100 $\mu$m monolayer film from a three component blend of 37.8 wt % ESI (same as Ex 1 top layer), 31.1 wt % polystyrene (STYRON* 665, 1.5 g/10 min MFR (ASTM D-1238, Condition G), The Dow Chemical Company), 30.0 wt % propylene/ethylene copolymer (same as Ex 1 top layer), and 1.1 wt % fluoroelastomer process aid (same as Ex 1 top layer), all percentages being based on total film weight.

EX 7

Replicate Ex 6 to prepare a 100 $\mu$m monolayer film from a three component blend of 22.2 wt % ESI (same as Ex 1 top layer), 22.2 wt % polystyrene (STYRON* 648, 1.2 g/10 min MFR (ASTM D-1238, Condition G), The Dow Chemical Company), 54.4 wt % propylene/ethylene copolymer (same as Ex 1 top layer), and 1.2 wt % fluoroelastomer process aid (same as Ex 1 top layer), all percentages being based on total film weight.

The films of Ex 6 and 7, like those of Ex 1–5, have excellent thermoformability and ease of removal. These traits make them excellent candidates for use in heat transfer foil applications using conventional technology.

All of the compositions and methods disclosed and claimed herein can be made and executed without undue experimentation in light of the present disclosure. While the compositions and methods of this invention have been described in terms of preferred embodiments, skilled artisans understand that variations may be applied to the compositions and/or methods and in the steps or in the sequence of steps of the methods described herein without departing from the concept, spirit and scope of the invention. More specifically, such artisans understand that certain chemically or physiologically related agents may be substituted for the agents described herein while the same or similar results would be achieved. All such variations, substitutions and modifications fall within the spirit, scope and concept of the invention defined by the appended claims.

What is claimed is:

1. A thermoformable polymer film, the film being used as a heat transfer foil carrier layer and comprising a blend of:
    A) a first polymer that is a substantially random interpolymer comprising in polymerized form, i) one or more of ethylene and an α-olefin monomer and ii) one or more vinyl or vinylidene aromatic monomers and/or one or more sterically hindered aliphatic or cycloaliphatic vinyl or vinylidene monomers, and optionally iii) other polymerizable ethylenically unsaturated monomer(s);
    B) a second polymer comprising in polymerized form a) one or more vinyl or vinylidene aromatic monomers, or b) one or more sterically hindered aliphatic or cycloaliphatic vinyl or vinylidene monomers, or c) a combination of a) and b); and
    C) a third polymer selected from:
        x) a propylene homopolymer or an interpolymer of propylene and one or more of ethylene and a $C_{4-8}$ α-olefin or both, or
        y) a polymer that comprises in polymerized form one or more of ethylene and an aliphatic α-olefin having from 3 to 20 carbon atoms or one or more ethylene and an α-olefin having from 3 to 20 carbon atoms and containing polar groups;
    wherein when C) is x), the concentration of A) is within a range of from 20 to 45 weight percent, the concentration of B) is within a range of from 25 to 45 weight percent, and the concentration of C) is within a range of from 20 to 55 weight percent; and when C) is y), the concentration of A) is within a range of from 30 to 40 weight percent, the concentration of B) is within a range of from 30 to 75 weight percent, and the concentration of C) is within a range of from 5 to 30 weight percent; all weight percentages being base on a combined weight of A), B), and C) and totaling 100 weight percent.

2. The film of claim 1, wherein the third polymer comprises y).

3. The film of claim 1, wherein the third polymer comprises x).

4. The film of claim 3, wherein the amount of first polymer is within a range of from 30 to 40 weight percent.

5. The film of claim 3, wherein the amount of second polymer is within a range of from 30 to 40 weight percent.

6. The film of claim 3, wherein the amount of third polymer is within a range of from 25 to 35 weight percent.

7. The film of claim 2, wherein the amount of third polymer is from 10 to 25 weight percent, based on combined weight of first, second and third polymers.

8. The film of claim 1, wherein the film has at least two spaced apart major planar surfaces and further comprises at least one skin layer that is bonded to a major planar surface.

9. The film of claim 8, wherein the skin layer comprises a polymer selected from polypropylene, low density polyethylene, linear low density polyethylene, high density polyethylene, ultralow density polyethylene, medium density polyethylene, metallocene ethylene/alpha-olefin copolymers, propylene/ethylene copolymers, ethylene-vinyl vinyl acetate copolymers, nylons, and acid or acid anhydride grafted versions of such polymers.

10. The film of claim 8, wherein the skin layer comprises a polymer selected from polypropylene, low density polyethylene, linear low density polyethylene, high density polyethylene, ultralow density polyethylene, medium density polyethylene, metallocene ethylene/alpha-olefin copolymers, propylene/ethylene copolymers, ethylene-vinyl acetate copolymers, nylons, and acid or acid anhydride grafted versions of such polymers.

11. The film of claim 9, wherein bonding between the film and the skin layer occurs by way of an adhesive layer that is disposed between a major planar surface of the film and the skin layer.

12. The film of claim 11, wherein the adhesive layer comprises an ethylene/vinyl acetate copolymer, an ethylene/styrene interpolymer or a blend thereof.

13. A thermoformable film-forming polymer blend composition comprising a blend of:
    A) a first polymer that is a substantially random interpolymer comprising in polymerized form, i) one or more of ethylene and an α-olefin monomer and ii) one or more vinyl or vinylidene aromatic monomers and/or one or more sterically hindered aliphatic or cycloaliphatic vinyl or vinylidene monomers, and optionally iii) other polymerizable ethylenically unsaturated monomer(s):
    B) a second polymer comprising in polymerized form a) one or more vinyl or vinylidene aromatic monomers, or b) one or more sterically hindered, aliphatic or cycloaliphatic vinyl or vinylidene monomers, or c) a combination of a) and b); and
    C) a third polymer, the third polymer being selected from
        x) a polypropylene homopolymer, an interpolymer of propylene and one or more of ethylene or a $C_{4-8}$ α-olefin monomer or both, or
        y) a polymer that comprises in polymerized form one or more of ethylene and an aliphatic α-olefin having from 3 to 20 carbon atoms or one or more of ethylene and an α-olefin having from 3 to 20 carbon atoms and containing polar groups;
    wherein when C) is x), the concentration of A) is within a range of from 20 to 45 weight percent, the concentration of B) is within a range of from 25 to 45 weight percent, and the concentration of C) is within a range of from 20 to 55 weight percent; and when C) is y), the concentration of A) is within a range of from 30 to 40 weight percent, the concentration of B) is within a range of from 30 to 75 weight percent, and the concentration of C) is within a range of from 5 to 30 weight percent; all weight percentages being base on a combined weight of A), B), and C) and totaling 100 weight percent.

14. The blend composition of claim 13, wherein the the blend contains a combination of a), b) and a third polymer is selectd from x).

15. The blend composition of claim 13, wherein the the blend contains a combination of a), b) and the third polymer is y).

16. The blend composition of claim 13, wherein the first polymer is an ethylene/styrene interpolymer, the second polymer is polystyrene homopolymer and the third polymer is polypropylene homopolymer.

17. The blend composition of claim 13, wherein the first polymer is an ethylene/styrene interpolymer, the second polymer is a rubber modified polystyrene homopolymer and the third polymer is polypropylene copolymer.

\* \* \* \* \*